US008037759B2

(12) United States Patent  
Peters et al.

(10) Patent No.: US 8,037,759 B2
(45) Date of Patent: Oct. 18, 2011

(54) METHOD AND DEVICE FOR DETERMINING THE RELATIVE POSITION, VELOCITY AND/OR ACCELERATION OF A BODY

(75) Inventors: Christian Peters, Freiburg (DE); Alexander Buhmann, Freiburg (DE); Yiannos Manoli, Freiburg (DE)

(73) Assignee: Albert-Ludwigs Universitat Freiburg, Freiburg (DE)

( * ) Notice: Subject to any disclaimer, the term of this patent is extended or adjusted under 35 U.S.C. 154(b) by 805 days.

(21) Appl. No.: 11/916,377

(22) PCT Filed: May 19, 2006

(86) PCT No.: PCT/EP2006/004749
§ 371 (c)(1),
(2), (4) Date: Jun. 4, 2008

(87) PCT Pub. No.: WO2006/128592
PCT Pub. Date: Jul. 15, 2006

(65) Prior Publication Data
US 2010/0005885 A1 Jan. 14, 2010

(30) Foreign Application Priority Data

Jun. 3, 2005 (DE) .......................... 10 2005 025 478

(51) Int. Cl.
G01P 15/08 (2006.01)
(52) U.S. Cl. ......................... 73/510; 73/514.02; 701/220
(58) Field of Classification Search ............ 73/510, 73/503, 504.02, 514.02; 701/220
See application file for complete search history.

(56) References Cited

U.S. PATENT DOCUMENTS 6,128,955 A * 10/2000 Mimura ........................ 73/510
2003/0093201 A1 5/2003 Schubert et al.

FOREIGN PATENT DOCUMENTS

DE 19856303 A1 1/2000
DE 19962687 A1 7/2001

OTHER PUBLICATIONS

Ralph Eger, "Estimation of Vehicle Rollovers", Dissertation, University of Karlsruhe Germany, 2000, Aachen Germany.
Kourosh Parsa, Ty A. Lasky, Bahram Ravani, Design and Mechatronic Implementation of an Accelerometer-Based Kinematically Redundant Inertial Measurement Unit, Proceedings of the 2005 IEEE/ASME International Conference on Advanced Intelligent Mechatronics, Jul. 24-28, 2005, 644-651, IEEE, Monterey California, USA.
David P. Vansickle, Rory A. Cooper, Demonstration of a Methodology for Wheelchair Acceleration Analysis, Human Engineering Laboratory, Department of Biomedical Engineering, California State University, 1301-1302, Sacramento, USA, 1993.
A. J. Padgaonkar, K. W. Krieger, A. I. King, Measurement of Angular Acceleration of a Rigid Body Using Linear Accelerometers, Transactions of the ASME: Journal of Applied Mechanics, Sep. 1975, 552-556.

* cited by examiner

Primary Examiner — John Chapman, Jr.
(74) Attorney, Agent, or Firm — The Webb Law Firm, PC

(57) ABSTRACT

In a method for determining the relative position, velocity, acceleration, and/or the rotation center of a body displaceable in a three dimensional space, at least twelve linear acceleration sensors are provided and in each case arranged on a position which is stationarily fixed with respect to the body. At least one acceleration measurement signal is captured by the linear acceleration sensors. A position, velocity, acceleration, and/or rotation center signal is generated for the body from the acceleration measurement signal and data describing the position and orientation of the linear acceleration sensors in the body-fixed coordinate system.

15 Claims, 8 Drawing Sheets $$\begin{pmatrix} a_{PS\_1} \\ a_{PS\_2} \\ a_{PS\_3} \\ a_{PS\_4} \\ a_{PS\_5} \\ a_{PS\_6} \\ a_{PS\_7} \\ a_{PS\_8} \\ a_{PS\_9} \\ a_{PS\_10} \\ a_{PS\_11} \\ a_{PS\_12} \end{pmatrix} = \vec{F} + \vec{G}$$

Fig. 1a $$\vec{F}_t = \begin{pmatrix} \theta_{x1} & \theta_{y1} & \theta_{z1} & \theta_{z1}r_{y1}-\theta_{y1}r_{z1} & -\theta_{z1}r_{x1}+\theta_{x1}r_{z1} & \theta_{y1}r_{x1}-\theta_{x1}r_{y1} \\ \theta_{x2} & \theta_{y2} & \theta_{z2} & \theta_{z2}r_{y2}-\theta_{y2}r_{z2} & -\theta_{z2}r_{x2}+\theta_{x2}r_{z2} & \theta_{y2}r_{x2}-\theta_{x2}r_{y2} \\ \theta_{x3} & \theta_{y3} & \theta_{z3} & \theta_{z3}r_{y3}-\theta_{y3}r_{z3} & -\theta_{z3}r_{x3}+\theta_{x3}r_{z3} & \theta_{y3}r_{x3}-\theta_{x3}r_{y3} \\ \theta_{x4} & \theta_{y4} & \theta_{z4} & \theta_{z4}r_{y4}-\theta_{y4}r_{z4} & -\theta_{z4}r_{x4}+\theta_{x4}r_{z4} & \theta_{y4}r_{x4}-\theta_{x4}r_{y4} \\ \theta_{x5} & \theta_{y5} & \theta_{z5} & \theta_{z5}r_{y5}-\theta_{y5}r_{z5} & -\theta_{z5}r_{x5}+\theta_{x5}r_{z5} & \theta_{y5}r_{x5}-\theta_{x5}r_{y5} \\ \theta_{x6} & \theta_{y6} & \theta_{z6} & \theta_{z6}r_{y6}-\theta_{y6}r_{z6} & -\theta_{z6}r_{x6}+\theta_{x6}r_{z6} & \theta_{y6}r_{x6}-\theta_{x6}r_{y6} \\ \theta_{x7} & \theta_{y7} & \theta_{z7} & \theta_{z7}r_{y7}-\theta_{y7}r_{z7} & -\theta_{z7}r_{x7}+\theta_{x7}r_{z7} & \theta_{y7}r_{x7}-\theta_{x7}r_{y7} \\ \theta_{x8} & \theta_{y8} & \theta_{z8} & \theta_{z8}r_{y8}-\theta_{y8}r_{z8} & -\theta_{z8}r_{x8}+\theta_{x8}r_{z8} & \theta_{y8}r_{x8}-\theta_{x8}r_{y8} \\ \theta_{x9} & \theta_{y9} & \theta_{z9} & \theta_{z9}r_{y9}-\theta_{y9}r_{z9} & -\theta_{z9}r_{x9}+\theta_{x9}r_{z9} & \theta_{y9}r_{x9}-\theta_{x9}r_{y9} \\ \theta_{x10} & \theta_{y10} & \theta_{z10} & \theta_{z10}r_{y10}-\theta_{y10}r_{z10} & -\theta_{z10}r_{x10}+\theta_{x10}r_{z10} & \theta_{y10}r_{x10}-\theta_{x10}r_{y10} \\ \theta_{x11} & \theta_{y11} & \theta_{z11} & \theta_{z11}r_{y11}-\theta_{y11}r_{z11} & -\theta_{z11}r_{x11}+\theta_{x11}r_{z11} & \theta_{y11}r_{x11}-\theta_{x11}r_{y11} \\ \theta_{x12} & \theta_{y12} & \theta_{z12} & \theta_{z12}r_{y12}-\theta_{y12}r_{z12} & -\theta_{z12}r_{x12}+\theta_{x12}r_{z12} & \theta_{y12}r_{x12}-\theta_{x12}r_{y12} \end{pmatrix} \cdot \begin{pmatrix} A_x \\ A_y \\ A_z \\ \dot{\omega}_x \\ \dot{\omega}_y \\ \dot{\omega}_z \end{pmatrix}$$

Fig. 1b

Fig. 1c $$\vec{G} = \begin{pmatrix} -\theta_{y1}r_{y1} - \theta_{z1}r_{z1} & -\theta_{x1}r_{x1} - \theta_{z1}r_{z1} & -\theta_{x1}r_{x1} - \theta_{y1}r_{y1} & \theta_{y1}r_{x1} + \theta_{x1}r_{y1} & \theta_{z1}r_{x1} + \theta_{x1}r_{z1} & \theta_{z1}r_{y1} + \theta_{y1}r_{z1} \\ -\theta_{y2}r_{y2} - \theta_{z2}r_{z2} & -\theta_{x2}r_{x2} - \theta_{z2}r_{z2} & -\theta_{x2}r_{x2} - \theta_{y2}r_{y2} & \theta_{y2}r_{x2} + \theta_{x2}r_{y2} & \theta_{z2}r_{x2} + \theta_{x2}r_{z2} & \theta_{z2}r_{y2} + \theta_{y2}r_{z2} \\ -\theta_{y3}r_{y3} - \theta_{z3}r_{z3} & -\theta_{x3}r_{x3} - \theta_{z3}r_{z3} & -\theta_{x3}r_{x3} - \theta_{y3}r_{y3} & \theta_{y3}r_{x3} + \theta_{x3}r_{y3} & \theta_{z3}r_{x3} + \theta_{x3}r_{z3} & \theta_{z3}r_{y3} + \theta_{y3}r_{z3} \\ -\theta_{y4}r_{y4} - \theta_{z4}r_{z4} & -\theta_{x4}r_{x4} - \theta_{z4}r_{z4} & -\theta_{x4}r_{x4} - \theta_{y4}r_{y4} & \theta_{y4}r_{x4} + \theta_{x4}r_{y4} & \theta_{z4}r_{x4} + \theta_{x4}r_{z4} & \theta_{z4}r_{y4} + \theta_{y4}r_{z4} \\ -\theta_{y5}r_{y5} - \theta_{z5}r_{z5} & -\theta_{x5}r_{x5} - \theta_{z5}r_{z5} & -\theta_{x5}r_{x5} - \theta_{y5}r_{y5} & \theta_{y5}r_{x5} + \theta_{x5}r_{y5} & \theta_{z5}r_{x5} + \theta_{x5}r_{z5} & \theta_{z5}r_{y5} + \theta_{y5}r_{z5} \\ -\theta_{y6}r_{y6} - \theta_{z6}r_{z6} & -\theta_{x6}r_{x6} - \theta_{z6}r_{z6} & -\theta_{x6}r_{x6} - \theta_{y6}r_{y6} & \theta_{y6}r_{x6} + \theta_{x6}r_{y6} & \theta_{z6}r_{x6} + \theta_{x6}r_{z6} & \theta_{z6}r_{y6} + \theta_{y6}r_{z6} \\ -\theta_{y7}r_{y7} - \theta_{z7}r_{z7} & -\theta_{x7}r_{x7} - \theta_{z7}r_{z7} & -\theta_{x7}r_{x7} - \theta_{y7}r_{y7} & \theta_{y7}r_{x7} + \theta_{x7}r_{y7} & \theta_{z7}r_{x7} + \theta_{x7}r_{z7} & \theta_{z7}r_{y7} + \theta_{y7}r_{z7} \\ -\theta_{y8}r_{y8} - \theta_{z8}r_{z8} & -\theta_{x8}r_{x8} - \theta_{z8}r_{z8} & -\theta_{x8}r_{x8} - \theta_{y8}r_{y8} & \theta_{y8}r_{x8} + \theta_{x8}r_{y8} & \theta_{z8}r_{x8} + \theta_{x8}r_{z8} & \theta_{z8}r_{y8} + \theta_{y8}r_{z8} \\ -\theta_{y9}r_{y9} - \theta_{z9}r_{z9} & -\theta_{x9}r_{x9} - \theta_{z9}r_{z9} & -\theta_{x9}r_{x9} - \theta_{y9}r_{y9} & \theta_{y9}r_{x9} + \theta_{x9}r_{y9} & \theta_{z9}r_{x9} + \theta_{x9}r_{z9} & \theta_{z9}r_{y9} + \theta_{y9}r_{z9} \\ -\theta_{y10}r_{y10} - \theta_{z10}r_{z10} & -\theta_{x10}r_{x10} - \theta_{z10}r_{z10} & -\theta_{x10}r_{x10} - \theta_{y10}r_{y10} & \theta_{y10}r_{x10} + \theta_{x10}r_{y10} & \theta_{z10}r_{x10} + \theta_{x10}r_{z10} & \theta_{z10}r_{y10} + \theta_{y10}r_{z10} \\ -\theta_{y11}r_{y11} - \theta_{z11}r_{z11} & -\theta_{x11}r_{x11} - \theta_{z11}r_{z11} & -\theta_{x11}r_{x11} - \theta_{y11}r_{y11} & \theta_{y11}r_{x11} + \theta_{x11}r_{y11} & \theta_{z11}r_{x11} + \theta_{x11}r_{z11} & \theta_{z11}r_{y11} + \theta_{y11}r_{z11} \\ -\theta_{y12}r_{y12} - \theta_{z12}r_{z12} & -\theta_{x12}r_{x12} - \theta_{z12}r_{z12} & -\theta_{x12}r_{x12} - \theta_{y12}r_{y12} & \theta_{y12}r_{x12} + \theta_{x12}r_{y12} & \theta_{z12}r_{x12} + \theta_{x12}r_{z12} & \theta_{z12}r_{y12} + \theta_{y12}r_{z12} \end{pmatrix} \cdot \begin{pmatrix} \omega_x^2 \\ \omega_y^2 \\ \omega_z^2 \\ \omega_x\omega_y \\ \omega_x\omega_z \\ \omega_y\omega_z \end{pmatrix}$$

| i | 1 | 2 | 3 | 4 | 5 | 6 | 7 | 8 | 9 | 10 | 11 | 12 |
|---|---|---|---|---|---|---|---|---|---|---|---|---|
| $r_{xi}$ [m] | 0 | 0 | 0 | -0,5 | -0,5 | -0,5 | 0,5 | 0,5 | 0,5 | 0 | 0 | 0 |
| $r_{yi}$ [m] | 0,5 | 0,5 | 0,5 | 0,5 | 0,5 | 0,5 | 0,5 | 0,5 | 0,5 | -0,5 | -0,5 | -0,5 |
| $r_{zi}$ [m] | -0,5 | -0,5 | -0,5 | 0,5 | 0,5 | 0,5 | 0,5 | 0,5 | 0,5 | 0 | 0 | 0 |

| i | 1 | 2 | 3 | 4 | 5 | 6 | 7 | 8 | 9 | 10 | 11 | 12 |
|---|---|---|---|---|---|---|---|---|---|---|---|---|
| $\Theta_{xi}$ [-] | -1 | 0 | 0 | 0 | 1 | 0 | 0 | -1 | 0 | 0 | 0 | 1 |
| $\Theta_{yi}$ [-] | 0 | 1 | 0 | 0 | 0 | -1 | 0 | 0 | -1 | 0 | 1 | 0 |
| $\Theta_{zi}$ [-] | 0 | 0 | 1 | -1 | 0 | 0 | -1 | 0 | 0 | -1 | 0 | 0 |

$$A = \begin{pmatrix} -1 & 0 & 0 & 0 & 0.5 & 0.5 & 0 & 0 & 0 & -0.5 & 0.5 & 0 \\ 0 & 1 & 0 & 0.5 & 0 & 0 & -0.5 & 0 & -0.5 & 0 & 0 & -0.5 \\ 0 & 0 & 1 & 0.5 & 0 & 0 & 0.5 & 0.5 & 0 & 0 & 0 & 0.5 \\ 0 & 0 & -1 & -0.5 & -0.5 & 0 & 0.5 & 0.5 & 0 & 0 & 0.5 & -0.5 \\ 1 & 0 & 0 & 0 & 0.5 & -0.5 & 0 & 0.5 & 0.5 & 0.5 & 0.5 & 0 \\ 0 & -1 & 0 & 0.5 & 0 & 0.5 & 0.5 & 0 & 0.5 & 0.5 & 0 & -0.5 \\ 0 & 0 & -1 & -0.5 & 0.5 & 0 & 0.5 & 0.5 & 0 & 0 & -0.5 & -0.5 \\ -1 & 0 & 0 & 0 & -0.5 & 0.5 & 0 & 0.5 & 0.5 & -0.5 & -0.5 & 0 \\ 0 & -1 & 0 & 0.5 & 0 & -0.5 & 0.5 & 0 & 0.5 & -0.5 & 0 & -0.5 \\ 0 & 0 & -1 & 0.5 & 0 & 0 & 0 & 0 & 0 & 0 & 0 & 0.5 \\ 0 & 1 & 0 & 0 & 0 & 0 & 0.5 & 0 & 0.5 & 0 & 0 & 0 \\ 1 & 0 & 0 & 0 & 0 & 0.5 & 0 & 0 & 0 & -0.5 & 0 & 0 \end{pmatrix}$$

Fig. 6

$$\begin{pmatrix} -0.25 & 0 & 0 & 0 & 0.125 & 0 & 0 & -0.125 & 0 & 0 & 0 & 0.5 \\ 0 & 0.25 & 0 & 0 & 0 & -0.125 & 0 & 0 & -0.125 & 0 & 0.5 & 0 \\ 0 & 0 & 0.25 & -0.125 & 0 & 0 & -0.125 & 0 & 0 & -0.5 & 0 & 0 \\ 0 & 0.5 & 0.25 & -0.125 & 0 & 0.25 & -0.125 & 0 & 0.25 & 0.5 & 0 & 0 \\ 0.5 & 0 & 0 & -0.5 & 0.25 & 0 & 0.5 & -0.25 & 0 & 0 & 0 & 0 \\ 0.25 & 0 & 0 & 0 & -0.125 & 0.5 & 0 & 0.125 & -0.5 & 0 & 0 & 0.5 \\ 0 & -0.25 & 0.5 & 0.25 & -0.5 & 0.125 & 0.25 & -0.5 & 0.125 & 0 & 0.5 & 0 \\ 0 & 0.25 & 0.5 & 0.25 & 0.5 & -0.125 & 0.25 & 0.5 & -0.125 & 0 & -0.5 & 0 \\ 0 & -0.25 & -0.5 & -0.25 & 0.5 & 0.125 & -0.25 & 0.5 & 0.125 & 0 & 0.5 & 0 \\ -0.25 & 0 & 0 & 0 & 0.125 & 0.5 & 0 & -0.125 & -0.5 & 0 & 0 & -0.5 \\ 0.5 & 0 & 0 & 0.5 & 0.25 & 0 & -0.5 & -0.25 & 0 & 0 & 0 & 0 \\ 0 & -0.5 & 0.25 & -0.125 & 0 & -0.25 & -0.125 & 0 & -0.25 & 0.5 & 0 & 0 \end{pmatrix}$$

Fig. 7

METHOD AND DEVICE FOR DETERMINING THE RELATIVE POSITION, VELOCITY AND/OR ACCELERATION OF A BODY

BACKGROUND OF THE INVENTION

The invention relates to a method for determining the relative position, velocity, and/or acceleration of a body displaceable in a one to three dimensional space, wherein a plurality of linear acceleration sensors, which in each case have a sensitive measurement axis, is arranged and wherein the individual linear acceleration sensors are always arranged on a position $P_i$ which is stationary with respect to the body. Furthermore, the invention relates to a device for determining the relative position, velocity, and/or acceleration of a body in a one to three dimensional space, wherein the device has a plurality of linear acceleration sensors stationarily arranged with respect to the body for capturing at least one acceleration measurement signal $\vec{a} = (a_1, a_2, a_3, a_4, \ldots a_n)$.

A relative position is to be understood as a position relative to a reference position, for example, a starting position. A linear acceleration sensor is to be understood as a unidirectional acceleration sensor, which is sensitive to accelerations that have at least one component that lies on the measurement axis of said linear acceleration sensor. The linear acceleration sensors can be structurally separated from each other, each one being arranged in its own housing. However, it is also possible for at least two and especially three linear acceleration accelerators having different measurement axes to be integrated as a multidirectional acceleration sensor in a common electric or electronic component.

A method and a device for determining the angular velocity of a turnable body, such as a vehicle, are disclosed in DE 199 62 687 A1. For measuring an acceleration measurement signal, a total of nine linear acceleration sensors, in each case having a sensitive measurement axis passing through the corresponding position, are fix mounted on the body in four non-adjacent positions. Three linear acceleration sensors, which in each case are oriented with their sensitive measurement axis toward one of the x, y, z axes of the body-fixed coordinate system, are provided in a first position arranged in the origin of the body-fixed coordinate system. Two other linear sensors, of which one is oriented with its measurement axis in z-direction and the other of which is oriented with its measurement axis in x-direction, are provided in a second position arranged at a distance $r_1$ from the origin on the y-axis. Two other linear sensors, of which one is oriented with its measurement axis in y-direction and the other of which is oriented with its measurement axis in z-direction, are provided in a third position arranged at a distance $r_2$ from the origin on the x-axis. In a corresponding manner, two linear sensors, which are oriented in x- or y-direction, are provided in a fourth position arranged on the z-axis at a distance $r_3$ from the origin. The acceleration $\vec{a}$ at a given point P is expressed as:

$$\vec{a} = A(t) + \vec{\omega} \times \vec{r} + \vec{\omega} \times (\vec{\omega} \times \vec{r}) + 2 \cdot \vec{\omega} \times \dot{\vec{r}} + \ddot{\vec{r}} \qquad \text{Equation (1)}$$

Where:
A is the acceleration of the origin of the body-fixed coordinate system,
t is the time,
$\vec{\omega}$ is the angular velocity of the body, and
$\vec{r}$ is the position vector that indicates the point P from the origin of the body-fixed coordinate system.

Assuming that a linear acceleration sensor is fix mounted on the point P of the body, the terms $\dot{\vec{r}}$ and $\ddot{\vec{r}}$ become equal to zero. With this assumption, one obtains:

$$\vec{a} = A(t) + \vec{\omega} \times \vec{r} + \vec{\omega} \times (\vec{\omega} \times \vec{r}) \qquad \text{Equation (2)}$$

This is a three dimensional, non-linear differential equation system, which as a rule cannot be solved analytically. The determination of the angular velocity of the turnable body therefore requires a relative complicated calculation. The device operating according to the procedure is therefore correspondingly complicated, expensive, and this notwithstanding, usually inaccurate.

DE 199 62 687 A1 discloses another prior art procedure in which the angular acceleration $\vec{\omega}_x$ of the body about the x-axis is measured by only four linear acceleration sensors fix mounted on the body. In this arrangement, two linear acceleration sensors are arranged in the origin of the body-fixed coordinate system, wherein a first linear acceleration sensor is oriented with its measurement axis toward the y-axis and a second linear acceleration sensor is oriented with its measurement axis toward the z-axis. A third linear acceleration sensor is arranged on the y-axis at a distance $r_1$ from the origin and oriented toward the z-axis. A fourth linear acceleration sensor is arranged on the z-axis at a distance $r_3$ from the origin with its sensitive measurement axis oriented toward the y-axis. If one plugs the positions of the four linear acceleration sensors into equation (2), algebraic transformation gives:

$$\dot{\omega}_x = \frac{a_{z1} - a_{z0}}{2 \cdot r_1} - \frac{a_{y3} - a_{y0}}{2 \cdot r_3} \qquad \text{Equation (3)}$$

wherein $a_{z0}$, $a_{z1}$, $a_{y0}$, $a_{y1}$ represent the measurement values of the four linear acceleration sensors. Equation (3), however, only applies to the special case where the first and third linear acceleration sensors are always oriented with their measurement axes exactly in y-direction and where both of the other linear acceleration sensors are oriented with their measurement axes perpendicular thereto in z-direction. The perpendicular arrangement of the linear acceleration sensors, however, is problematic in practice, as manufacturing and positioning tolerances arise in the manufacture and attachment of the linear acceleration sensors on the body. Deviations in positioning and alignment are almost inevitable, especially when mounting the linear acceleration sensors on the body. Even small deviations of the position of the linear acceleration sensors from the sensor arrangement on which equation (3) is based can lead to relatively large errors in the calculation of the angular acceleration $\vec{\omega}_x$. This is especially disadvantageous when the angular acceleration signal for determining the position of the body integrates and the errors add up without limit. This last point in particular was the decisive reason why the use of position determining devices that employ linear sensors only never caught on.

It is therefore the object of the invention to develop a method and a device as mentioned in the introduction that enable a simple, exact determination of the position, velocity, and/or acceleration of one of the bodies.

SUMMARY OF THE INVENTION

This object is achieved according to the method by provision of a plurality of n linear acceleration sensors, in each case having a sensitive measurement axis, wherein the plurality n is at least twelve, wherein the individual linear acceleration sensors are always arranged on a fixed position $P_i$ with respect to the body and which can be described by a stationary position vector $\vec{r}_i = (r_{xi}, r_{yi}, r_{zi})$ indicating the respective position $P_i$ from a body-fixed reference point, wherein the linear acceleration sensors are aligned so that in each case their measurement axes are oriented toward a direction vector $\vec{\Theta}_i = (\Theta_{xi}, \Theta_{yi}, \Theta_{zi})$, wherein $i \in [1, 2, 3, 4, \ldots n]$ in each case designate the respective linear acceleration sensor and the x, y, z axes of a body-fixed coordinate system that pass through the reference point, and wherein the position vectors $\vec{r}_i$ and the direction vectors $\vec{\Theta}_i$ are selected so that the rank of a twelve column matrix formed from the column vectors $$\vec{s}_1 = \begin{pmatrix} \Theta_{x1} \\ \Theta_{x2} \\ \Theta_{x3} \\ \Theta_{x4} \\ \vdots \\ \Theta_{xn} \end{pmatrix}, \vec{s}_2 = \begin{pmatrix} \Theta_{y1} \\ \Theta_{y2} \\ \Theta_{y3} \\ \Theta_{y4} \\ \vdots \\ \Theta_{yn} \end{pmatrix}, \vec{s}_3 = \begin{pmatrix} \Theta_{z1} \\ \Theta_{z2} \\ \Theta_{z3} \\ \Theta_{z4} \\ \vdots \\ \Theta_{zn} \end{pmatrix}, \vec{s}_4 = \begin{pmatrix} \Theta_{z1}r_{y1} - \Theta_{y1}r_{z1} \\ \Theta_{z2}r_{y2} - \Theta_{y2}r_{z2} \\ \Theta_{z3}r_{y3} - \Theta_{y3}r_{z3} \\ \Theta_{z4}r_{y4} - \Theta_{y4}r_{z4} \\ \vdots \\ \Theta_{zn}r_{yn} - \Theta_{yn}r_{zn} \end{pmatrix},$$

$$\vec{s}_5 = \begin{pmatrix} \Theta_{x1}r_{z1} - \Theta_{z1}r_{x1} \\ \Theta_{x2}r_{z2} - \Theta_{z2}r_{x2} \\ \Theta_{x3}r_{z3} - \Theta_{z3}r_{x3} \\ \Theta_{x4}r_{z4} - \Theta_{z4}r_{x4} \\ \vdots \\ \Theta_{xn}r_{zn} - \Theta_{zn}r_{xn} \end{pmatrix}, \vec{s}_6 = \begin{pmatrix} \Theta_{y1}r_{x1} - \Theta_{x1}r_{y1} \\ \Theta_{y2}r_{x2} - \Theta_{x2}r_{y2} \\ \Theta_{y3}r_{x3} - \Theta_{x3}r_{y3} \\ \Theta_{y4}r_{x4} - \Theta_{x4}r_{y4} \\ \vdots \\ \Theta_{yn}r_{xn} - \Theta_{xn}r_{yn} \end{pmatrix},$$

$$\vec{s}_7 = \begin{pmatrix} \Theta_{y1}r_{y1} - \Theta_{z1}r_{z1} \\ \Theta_{y2}r_{y2} - \Theta_{z2}r_{z2} \\ \Theta_{y3}r_{y3} - \Theta_{z3}r_{z3} \\ \Theta_{y4}r_{y4} - \Theta_{z4}r_{z4} \\ \vdots \\ \Theta_{yn}r_{yn} - \Theta_{zn}r_{zn} \end{pmatrix}, \vec{s}_8 = \begin{pmatrix} \Theta_{x1}r_{x1} - \Theta_{z1}r_{z1} \\ \Theta_{x2}r_{x2} - \Theta_{z2}r_{z2} \\ \Theta_{x3}r_{x3} - \Theta_{z3}r_{z3} \\ \Theta_{x4}r_{x4} - \Theta_{z4}r_{z4} \\ \vdots \\ \Theta_{xn}r_{xn} - \Theta_{zn}r_{zn} \end{pmatrix},$$

$$\vec{s}_9 = \begin{pmatrix} \Theta_{x1}r_{x1} - \Theta_{y1}r_{y1} \\ \Theta_{x2}r_{x2} - \Theta_{y2}r_{y2} \\ \Theta_{x3}r_{x3} - \Theta_{y3}r_{y3} \\ \Theta_{x4}r_{x4} - \Theta_{y4}r_{y4} \\ \vdots \\ \Theta_{xn}r_{xn} - \Theta_{yn}r_{yn} \end{pmatrix}, \vec{s}_{10} = \begin{pmatrix} \Theta_{y1}r_{x1} + \Theta_{x1}r_{y1} \\ \Theta_{y2}r_{x2} + \Theta_{x2}r_{y2} \\ \Theta_{y3}r_{x3} + \Theta_{x3}r_{y3} \\ \Theta_{y4}r_{x4} + \Theta_{x4}r_{y4} \\ \vdots \\ \Theta_{yn}r_{xn} + \Theta_{xn}r_{yn} \end{pmatrix},$$

$$\vec{s}_{11} = \begin{pmatrix} \Theta_{z1}r_{x1} + \Theta_{x1}r_{z1} \\ \Theta_{z2}r_{x2} + \Theta_{x2}r_{z2} \\ \Theta_{z3}r_{x3} + \Theta_{x3}r_{z3} \\ \Theta_{z4}r_{x4} + \Theta_{x4}r_{z4} \\ \vdots \\ \Theta_{zn}r_{xn} + \Theta_{xn}r_{zn} \end{pmatrix} \text{ and } \vec{s}_{12} = \begin{pmatrix} \Theta_{z1}r_{y1} + \Theta_{y1}r_{z1} \\ \Theta_{z2}r_{y2} + \Theta_{y2}r_{z2} \\ \Theta_{z3}r_{y3} + \Theta_{y3}r_{z3} \\ \Theta_{z4}r_{y4} + \Theta_{y4}r_{z4} \\ \vdots \\ \Theta_{zn}r_{yn} + \Theta_{yn}r_{zn} \end{pmatrix}$$

equals twelve, wherein by means of the linear acceleration sensors at least one acceleration measurement signal $\vec{a} = (a_1, a_2, a_3, a_4, \ldots a_n)$ is captured, and wherein a position, velocity, and/or acceleration signal for the body is generated from the acceleration measurement signal and data that describe the relative position and orientation of the linear acceleration sensors in the body-fixed coordinate system.

The invention is based on equation (2), which can be written in vector notation in terms of its fractions in the body-fixed coordinates x, y, z, as follows:

$$\begin{pmatrix} a_x \\ a_y \\ a_z \end{pmatrix} = \begin{pmatrix} A_x \\ A_y \\ A_z \end{pmatrix} + \begin{pmatrix} r_z \dot{\omega}_y - r_y \dot{\omega}_z \\ -r_z \dot{\omega}_x + r_x \dot{\omega}_z \\ r_y \dot{\omega}_x - r_x \dot{\omega}_y \end{pmatrix} + \quad \text{Equation (4)}$$

$$\begin{pmatrix} r_y \omega_x \omega_y - r_y \omega_y^2 + r_z \omega_x \omega_z - r_x \omega_z^2 \\ r_x \omega_x \omega_y - r_y \omega_x^2 + r_z \omega_y \omega_z - r_y \omega_z^2 \\ r_x \omega_x \omega_y - r_x \omega_y^2 + r_y \omega_y \omega_z - r_z \omega_x^2 \end{pmatrix}$$

Because the individual linear acceleration sensors in each case only have one sensitive measurement axis for the direction vector $\vec{\Theta}_i$, the scalar product must be derived from equation (4) and $\vec{\Theta}_i$. This gives equation (5), which describes the acceleration $a_i$ measured by the linear acceleration sensor i in point $P_i$:

$$a_i = \theta_z \begin{pmatrix} A_z - r_x \omega_x^2 - r_z \omega_y^2 + r_x \omega_x \omega_z + \\ r_y \omega_y \omega_z + r_y \dot{\omega}_x - r_x \dot{\omega}_y \end{pmatrix} + \quad \text{Equation (5)}$$

$$\theta_y \begin{pmatrix} A_y - r_y \omega_x^2 - r_y \omega_z^2 + r_x \omega_x \omega_y + \\ r_z \omega_y \omega_z + r_y \dot{\omega}_z - r_z \dot{\omega}_x \end{pmatrix} +$$

$$\theta_x \begin{pmatrix} A_x - r_x \omega_y^2 - r_x \omega_z^2 + r_y \omega_x \omega_y + \\ r_z \omega_x \omega_z + r_x \dot{\omega}_y - r_y \dot{\omega}_z \end{pmatrix}$$

If one considers the right-hand side of equation (5), it is evident that it is formed from the following twelve values, of which six are independent:

$$w = (A_x, A_y, A_z, \dot{\omega}_x, \dot{\omega}_y, \dot{\omega}_z, \omega_x^2, \omega_y^2, \omega_z^2, \omega_x \omega_y, \omega_x \omega_z, \omega_y \omega_z)$$

The remaining values describe the spatial position $\vec{r}_i$ or the spatial orientation $\vec{\Theta}_i$ of the linear acceleration sensors.

If a plurality n of at least twelve linear acceleration sensors is employed, the measurement values $a_1$ through $a_n$ are obtained. If one writes equation (5) for the n sensors one below the other, the following equation system is obtained, which is only partially shown due to lack of space:

$$a_1 = \theta_{z1} \begin{pmatrix} A_z - r_{z1} \omega_x^2 - r_{z1} \omega_y^2 + r_{x1} \omega_x \omega_z + \\ r_{y1} \omega_y \omega_z + r_{y1} \dot{\omega}_x - r_{x1} \dot{\omega}_y \end{pmatrix} + \ldots \quad \text{Equation (6)}$$

$$a_2 = \theta_{z2} \begin{pmatrix} A_z - r_{z2} \omega_x^2 - r_{z2} \omega_y^2 + r_{x2} \omega_x \omega_z + \\ r_{y2} \omega_y \omega_z + r_{y2} \dot{\omega}_x - r_{x2} \dot{\omega}_y \end{pmatrix} + \ldots$$

$$\ldots$$

$$a_n = \theta_{z12} \begin{pmatrix} A_z - r_{z12} \omega_x^2 - r_{z12} \omega_y^2 + r_{x12} \omega_x \omega_z + \\ r_{y12} \omega_y \omega_z + r_{y12} \dot{\omega}_x - r_{x12} \dot{\omega}_y \end{pmatrix} + \ldots$$

If the above-mentioned twelve values are isolated from the right side of equation (6), the equation system shown in FIG. 1a through 1c is obtained, which can be simplified as:

$$\vec{a} = \underline{A} \cdot \vec{w} \quad \text{Equation (7)}$$

In order to be able to define the motion of the body from the acceleration measurement signal $\vec{a}$, equation (7) must be solved for $\vec{w}$. To this end, the 12×n matrix $\overline{\overline{A}}$ must be invertible, which it is if the linear acceleration sensors are arranged in such a way that the matrix $\overline{\overline{A}}$ formed from the column vectors $\vec{s}_1$, $\vec{s}_2$, $\vec{s}_3$, $\vec{s}_4$, $\vec{s}_5$, $\vec{s}_6$, $\vec{s}_7$, $\vec{s}_8$, $\vec{s}_9$, $\vec{s}_{10}$, $\vec{s}_{11}$ and $\vec{s}_{12}$ mentioned in claim 1 has the rank $Rg(\overline{\overline{A}})=12$ or is linearly independent and therefore the determinant of $\overline{\overline{A}}$ is not equal to 0. According to the algorithm:

$$\vec{w} = \overline{\overline{A}}^{-1} \cdot \vec{a} \qquad \text{Equation (8)}$$

The method of the invention advantageously enables a simple, precise determination of the relative position, velocity, and/or acceleration of the body even with measurement axes obliquely aligned with each other, without having to solve a differential equation system numerically.

After arrangement of the linear acceleration sensors on the positions $P_i$ in a preferred embodiment of the invention, at least five measurements are taken, in which the body is linearly accelerated and/or accelerated about at least one known center of rotation in various known directions with respect to an earth-fixed coordinate system, wherein with each measurement an acceleration measurement signal $\vec{a}_k = (a_1, a_2, a_3, a_4, \ldots a_n)$ is captured in each case, and wherein the data describing the position and orientation of the linear acceleration sensors are determined from the acceleration measurement signals $\vec{a}_k$ and the directions and/or the at least one rotation center. A calibration step in which the data are determined in relation to the respective position and alignment of the linear acceleration sensors is thus carried out so that any potential tolerances arising in the manufacture and/or positioning of the linear acceleration sensors on the body are considered in the capture of the position, velocity, acceleration, and or rotation center signal. It is thus possible to achieve great measurement accuracy even with relatively high manufacturing and positioning tolerances of the linear acceleration sensors.

In an advantageous embodiment of the invention, the relative position of a rotation center about which the body spatially rotates is calculated from the velocity signal. For determining the rotation center of the rotary motion, the point is sought at which the velocity equals zero. In a vehicle, for example, the triggering of a safety mechanism for protecting the passengers can be controlled with respect to the position of the rotation center relative to the center of the vehicle and relative to the angular velocity and/or angular acceleration of the vehicle.

With regard to the device, the aforementioned objective is achieved in that said device for the capture of at least one acceleration measurement signal $\vec{a} = (a_1, a_2, a_3, a_4, \ldots a_n)$ has a plurality of n linear acceleration sensors stationarily arranged with respect to the body, wherein said plurality n is at least twelve, wherein the positions $P_i$ on which said linear acceleration sensors are arranged in each case can be described by a stationary position vector $\vec{r}_i = (r_{xi}, r_{yi}, r_{zi})$, which indicates the respective position $P_i$ from a body-fixed reference point, wherein the linear acceleration sensors in each case have a sensitive measurement axis oriented toward a direction vector $\vec{\Theta}_i = (\Theta_{xi}, \Theta_{yi}, \Theta_{zi})$, wherein the respective linear acceleration sensor and the x, y, z axes of a body-fixed coordinate system passing through the reference point are in each case designated by $i \in [1, 2, 3, 4, \ldots n]$, wherein the position vectors it and the direction vectors $\vec{\Theta}_i$ are selected so that the rank of a twelve column matrix formed from the column vectors $$\vec{s}_1 = \begin{pmatrix} \Theta_{x1} \\ \Theta_{x2} \\ \Theta_{x3} \\ \Theta_{x4} \\ \vdots \\ \Theta_{xn} \end{pmatrix}, \vec{s}_2 = \begin{pmatrix} \Theta_{y1} \\ \Theta_{y2} \\ \Theta_{y3} \\ \Theta_{y4} \\ \vdots \\ \Theta_{yn} \end{pmatrix}, \vec{s}_3 = \begin{pmatrix} \Theta_{z1} \\ \Theta_{z2} \\ \Theta_{z3} \\ \Theta_{z4} \\ \vdots \\ \Theta_{zn} \end{pmatrix}, \vec{s}_4 = \begin{pmatrix} \Theta_{z1}r_{y1} - \Theta_{y1}r_{z1} \\ \Theta_{z2}r_{y2} - \Theta_{y2}r_{z2} \\ \Theta_{z3}r_{y3} - \Theta_{y3}r_{z3} \\ \Theta_{z4}r_{y4} - \Theta_{y4}r_{z4} \\ \vdots \\ \Theta_{zn}r_{yn} - \Theta_{yn}r_{zn} \end{pmatrix},$$

$$\vec{s}_5 = \begin{pmatrix} \Theta_{x1}r_{z1} - \Theta_{z1}r_{x1} \\ \Theta_{x2}r_{z2} - \Theta_{z2}r_{x2} \\ \Theta_{x3}r_{z3} - \Theta_{z3}r_{x3} \\ \Theta_{x4}r_{z4} - \Theta_{z4}r_{x4} \\ \vdots \\ \Theta_{xn}r_{zn} - \Theta_{zn}r_{xn} \end{pmatrix}, \vec{s}_6 = \begin{pmatrix} \Theta_{y1}r_{x1} - \Theta_{x1}r_{y1} \\ \Theta_{y2}r_{x2} - \Theta_{x2}r_{y2} \\ \Theta_{y3}r_{x3} - \Theta_{x3}r_{y3} \\ \Theta_{y4}r_{x4} - \Theta_{x4}r_{y4} \\ \vdots \\ \Theta_{yn}r_{xn} - \Theta_{xn}r_{yn} \end{pmatrix},$$

$$\vec{s}_7 = \begin{pmatrix} \Theta_{y1}r_{y1} - \Theta_{z1}r_{z1} \\ \Theta_{y2}r_{y2} - \Theta_{z2}r_{z2} \\ \Theta_{y3}r_{y3} - \Theta_{z3}r_{z3} \\ \Theta_{y4}r_{y4} - \Theta_{z4}r_{z4} \\ \vdots \\ \Theta_{yn}r_{yn} - \Theta_{zn}r_{zn} \end{pmatrix}, \vec{s}_8 = \begin{pmatrix} \Theta_{x1}r_{x1} - \Theta_{z1}r_{z1} \\ \Theta_{x2}r_{x2} - \Theta_{z2}r_{z2} \\ \Theta_{x3}r_{x3} - \Theta_{z3}r_{z3} \\ \Theta_{x4}r_{x4} - \Theta_{z4}r_{z4} \\ \vdots \\ \Theta_{xn}r_{xn} - \Theta_{zn}r_{zn} \end{pmatrix},$$

$$\vec{s}_9 = \begin{pmatrix} \Theta_{x1}r_{x1} - \Theta_{y1}r_{y1} \\ \Theta_{x2}r_{x2} - \Theta_{y2}r_{y2} \\ \Theta_{x3}r_{x3} - \Theta_{y3}r_{y3} \\ \Theta_{x4}r_{x4} - \Theta_{y4}r_{y4} \\ \vdots \\ \Theta_{xn}r_{xn} - \Theta_{yn}r_{yn} \end{pmatrix}, \vec{s}_{10} = \begin{pmatrix} \Theta_{y1}r_{x1} + \Theta_{x1}r_{y1} \\ \Theta_{y2}r_{x2} + \Theta_{x2}r_{y2} \\ \Theta_{y3}r_{x3} + \Theta_{x3}r_{y3} \\ \Theta_{y4}r_{x4} + \Theta_{x4}r_{y4} \\ \vdots \\ \Theta_{yn}r_{xn} + \Theta_{xn}r_{yn} \end{pmatrix},$$

$$\vec{s}_{11} = \begin{pmatrix} \Theta_{z1}r_{x1} + \Theta_{x1}r_{z1} \\ \Theta_{z2}r_{x2} + \Theta_{x2}r_{z2} \\ \Theta_{z3}r_{x3} + \Theta_{x3}r_{z3} \\ \Theta_{z4}r_{x4} + \Theta_{x4}r_{z4} \\ \vdots \\ \Theta_{zn}r_{xn} + \Theta_{xn}r_{zn} \end{pmatrix} \text{ and } \vec{s}_{12} = \begin{pmatrix} \Theta_{z1}r_{y1} + \Theta_{y1}r_{z1} \\ \Theta_{z2}r_{y2} + \Theta_{y2}r_{z2} \\ \Theta_{z3}r_{y3} + \Theta_{y3}r_{z3} \\ \Theta_{z4}r_{y4} + \Theta_{y4}r_{z4} \\ \vdots \\ \Theta_{zn}r_{yn} + \Theta_{yn}r_{zn} \end{pmatrix}$$

equals twelve, and wherein the linear acceleration sensors are connected to an evaluator configured to generate a position, velocity, and/or acceleration signal for the body out of the acceleration measurement signal $\vec{a}$ and data that describe the relative position and orientation of the linear acceleration sensors in the body-fixed coordinate system.

As explained previously for the method, the measurement axes of the at least twelve linear acceleration sensors can also be discretionarily obliquely aligned with each other as long as the matrix formed from the twelve column vectors $\vec{s}_1$, $\vec{s}_2$, $\vec{s}_3$, $\vec{s}_4$, $\vec{s}_5$, $\vec{s}_6$, $\vec{s}_7$, $\vec{s}_8$, $\vec{s}_9$, $\vec{s}_{10}$, $\vec{s}_{11}$, $\vec{s}_{12}$ is linearly independent. Nevertheless, the relative position, velocity, and/or acceleration signal can be determined with great precision by means of the device. This is especially advantageous when the body is a vehicle body, as the linear acceleration sensors can now be installed on suitable sites in the vehicle. The employment of linear acceleration sensors already present in the vehicle, for example airbag sensors, for the device of the invention is even conceivable.

The device can be a component in an inertial navigation system (INS). Furthermore, the navigation system can also have a global positioning system (GPS), which shows the positions of a plurality of satellites orbiting the earth. Preference is given to employment of the inertial navigation system when there is temporary interference with the GPS positioning, for example, when the path to the satellites is blocked by an obstruction. The dynamic but long-term unstable INS can be coupled with the sluggish but long-term stable GPS via a suitable mathematical filter, especially a Kaiman filter, an extended Kaiman filter, and/or a particle filter. This enables the achievement of a dynamic and long-term stable system with better characteristics than the corresponding single system. Furthermore, an online auto-calibration is also possible.

Applications of the device of the invention are not limited to the automotive field. The device is also especially suited to applications in medical technology, in an aircraft or watercraft, as well as to all other applications that require measurement of the spatial position and motion of a body.

in an advantageous embodiment of the invention, the evaluator has a data storage in which at least one data signal for a line vector of a data matrix is filed, said matrix being the inverse of a twelve column matrix comprising the column vectors $\vec{s}_1, \vec{s}_2, \vec{s}_3, \vec{s}_4, \vec{s}_5, \vec{s}_6, \vec{s}_7, \vec{s}_8, \vec{s}_9, \vec{s}_{10}, \vec{s}_{11}, \vec{s}_{12}$. To this end, the device can have a microprocessor, in which the calculation of the relative position, velocity, and/or acceleration signal is performed, connected to the data storage. Preference is given to calculation of the data matrix on the basis of measurement values for the position and alignment of the individual linear acceleration sensors relative to the body-fixed coordinate system. Obviously the data matrix can also be specified, for example, when the position and alignment of the individual linear acceleration sensors are known by means other than measurement.

It is advantageous if the evaluator has means for generating at least one first scalar product signal corresponding to the scalar product from the at least one data signal and the acceleration measurement signal $\vec{a}$, and if the at least one data signal is selected so that at least a first scalar product signal corresponds to a vectorial component of the translatory acceleration of the body. To this end, preference is given to configuration of these means wherein in each case a component for the translatory acceleration of the body with respect to the body-fixed coordinate system is determined by means of the device for three directions running diagonally to each other, say, the directions of the axes of a Cartesian coordinate system.

In a preferred embodiment of the invention, the evaluator has means for generating at least one second scalar product signal corresponding to the scalar product from the at least one data signal and the acceleration measurement signal $\vec{a}$, wherein the at least one data signal is selected so that the second scalar product signal corresponds to a vectorial component of the angular acceleration of the body. To this end, preference is given to configuration of these means wherein in each case a component for the angular acceleration of the body with respect to the body-fixed coordinate system is determined by means of the device for three directions running diagonally to each other, say, the directions of the axes of a Cartesian coordinate system.

In a functional embodiment of the invention, the evaluator has means, should the situation arise, for the two-fold integration of the at least one second scalar product signal. The angular velocity and/or the rotary position of the body with respect to a starting position can then be determined from the angular acceleration. The device can thus be employed especially for controlling a safety mechanism to protect the passengers of a vehicle from injury in the event said vehicle is rolled. To this end, the device can serve in particular for determining the angle which a specified axis, say, the lengthwise axis, of a vehicle assumes with respect to the direction of the acceleration due to gravity, in order to trigger the safety mechanism at the right time in the event the vehicle is rolled. The critical angle at which a rollover is unavoidable shifts depending on whether the vehicle is on level ground or a hill. The spatial position of the rotary axis is also of great importance for deciding what measures should be taken in the event of a probable rollover. If the rotation axis is located, say, inside the vehicle, a different safety mechanism can be employed than if the rotation axis is located outside the vehicle. The sturdiness of the linear acceleration sensors is especially advantageous in a vehicle as a safety device, because said sensors must not be destroyed during a collision before the actual rollover.

In an advantageous embodiment of the invention, the evaluator has means for generating at least one third scalar product signal corresponding to the scalar product from the at least one data signal and the acceleration measurement signal $\vec{a}$, wherein the at least one data signal is selected so that the third scalar product signal corresponds to the square of a vectorial component of the angular velocity of the body, and wherein the evaluator has means for generating a square root signal from the scalar product signal. The device can then provide a measurement signal for the magnitude of the angular velocity of the body.

It is advantageous if the evaluator has means for generating at least one fourth scalar product signal corresponding to the scalar product from the at least one data signal and the acceleration measurement signal $\vec{a}$, if the at least one data signal is selected so that the fourth scalar product signal corresponds to the product of two different vectorial components of the angular velocity of the body, if the evaluator has means for the integration of the second scalar product signals detected in each case for the respective vectorial components and for generating at least one product signal from the results of these integrations, if the evaluator has a comparison mechanism for comparing the strength of this product signal with the fourth scalar product signal, and if the comparison mechanism has an output for an error status signal dependent on the result of the comparison. The second and fourth scalar product signals are thus subjected to a plausibility test. Should it be established that the corresponding scalar product signals do not match, the relative position, velocity, and/or acceleration signal detected by the device can be deleted and/or the triggering of a safety mechanism control-connected to the device can be blocked.

The comparison mechanism is functionally configured for the comparison of the square root signal with the signal formed from the integration of the at least one second scalar product signal and has an output for an error status signal dependent on the result of the comparison. The plausibility of the measurement results can then be checked even more effectively.

It is advantageous if the evaluator has means for integrating the second scalar product signal and for forming the square from the result of this integration, if said means for comparing the signal thus obtained with the third scalar product signal is connected to the comparison mechanism, and if the comparison mechanism has an output for an error status signal dependent on the result of the comparison. The plausibility of the second and third scalar product signals is thus checked.

In a preferred embodiment of the invention, the evaluator has a differentiating mechanism for differentiating the square root signal, wherein the differentiating mechanism for comparison of the differentiated signal with the second scalar product signal is connected to the comparison mechanism, and wherein the comparison mechanism has an output for an error status signal dependent on the result of the comparison. This means also enables a simple and rapid plausibility test of the measurement results.

BRIEF DESCRIPTION OF THE DRAWINGS

In the following, an illustrative embodiment of the invention is explained in more detail with reference to the drawing, wherein:

FIG. 1a through 1c show an equation system comprising two vectors and a matrix for twelve linear acceleration sensors, FIG. 6 shows the matrix from the equation system shown in FIG. 2 for the linear acceleration sensor arrangement shown in FIG. 3, FIG. 7 shows a matrix which is the inverse of the matrix shown in FIG. 6.

A device for determining the relative position, velocity, and should the need arise, the rotary center of a body 1 situated in a three dimensional space (FIG. 2) described by the coordinates u, v, w of a space- or earth-fixed coordinate system has at least twelve linear acceleration sensors 2, which are stationarily arranged with respect to the body 1 and which in each case are sensitive along a sensitive measurement axis 3, for the capture of at least one acceleration measurement signal $\vec{a}=(a_1, a_2, a_3, a_4, a_5, a_6, a_7, a_8, a_9, a_{10}, a_{11}, a_{12})$. The body 1 is freely spatially displaceable, in other words, displaceable along the axes u, v, w and in each case capable of being rotated about the axes u, v, w.

DESCRIPTION OF THE PREFERRED EMBODIMENTS

Figure 2:
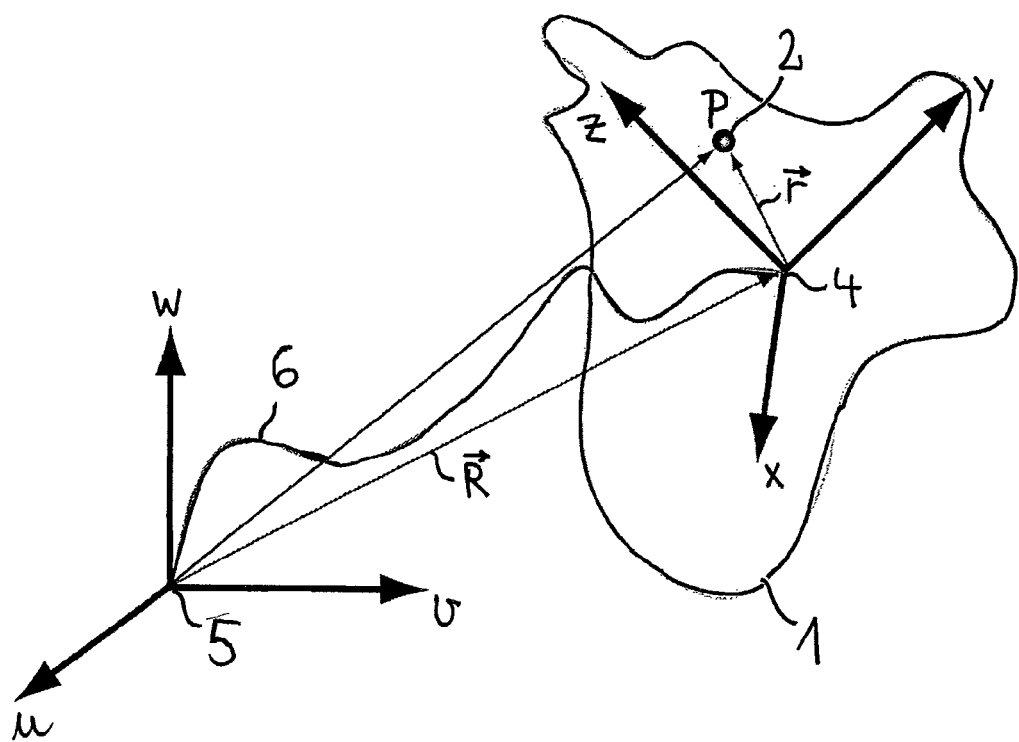
FIG. 2 shows a schematic illustration of a body which is displaceable in a three dimensional space toward the three axes u, v, w of a Cartesian earth-fixed coordinate system and which is pivotable about these axes.

It can be discerned in FIG. 2 that a body-fixed Cartesian coordinate system with the axes x, y, and z and the origin 4 is allocated to the body. The origin 5 of the space-fixed coordinate system u, v, w is connected to the origin 4 of the body-fixed coordinate system x, y, z by a vector $\vec{R}$. A path 6 along which the origin 4 of the body-fixed coordinate system x, y, z was displaced is illustratively shown in FIG. 2. A point P remote from the origin 4 of the body 1 is also shown. The origin 4 is connected to the point P by a vector $\vec{r}$.

Figure 3:
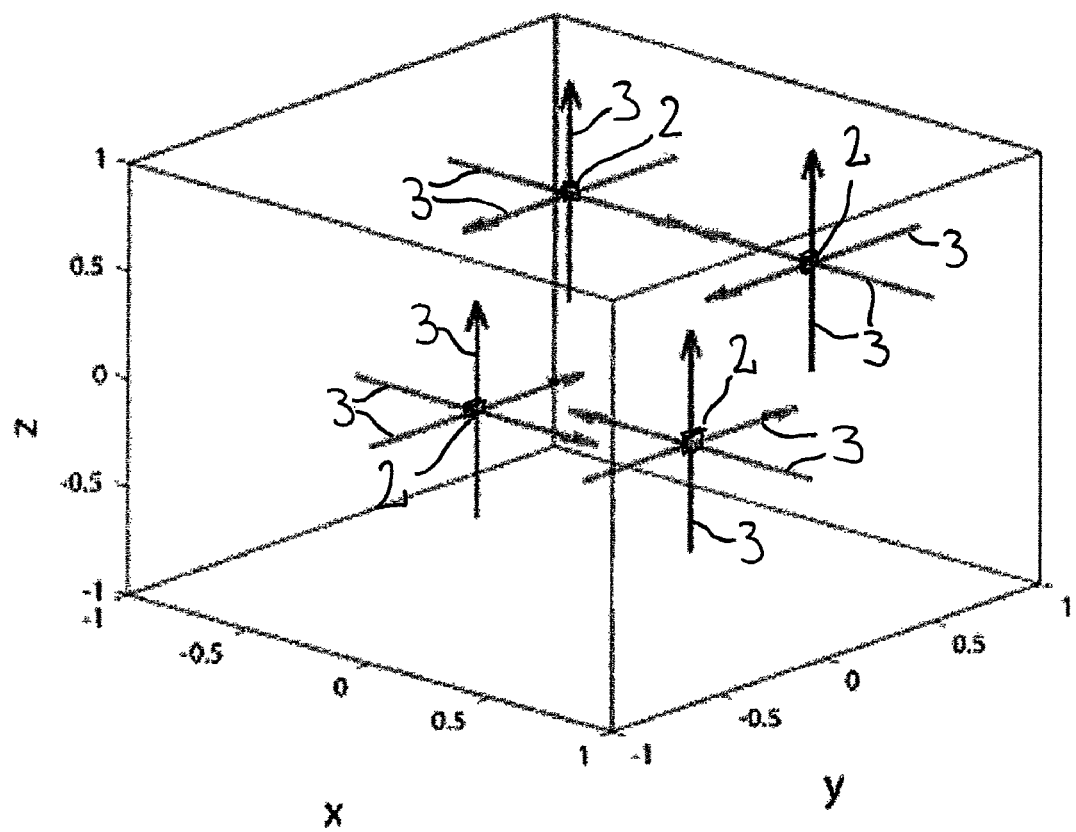
FIG. 3 shows a schematic illustration of the measurement axes of linear acceleration sensors affixed to and detached from the body in a body-fixed coordinate system with the axes x, y, and z.

The measurement axes 3 of the linear acceleration sensors 2 are shown in the body-fixed coordinate system x, y, z in FIG. 3. The coordinates $r_{xi}, r_{yi}, r_{zi}$ of the position vectors $\vec{r}_i$ and the coordinates $\Theta_{xi}, \Theta_{yi}, \Theta_{zi}$ of the direction vectors $\vec{\Theta}_i$ of the measurement axes 3 are listed in each case in FIG. 4. The index $i \in [1, 2, 3, 4, \ldots 12]$ corresponds to the number of the respective linear acceleration sensor 2. Preference is given to calibration for determining the position vectors 4 and the direction vectors $\vec{\Theta}_i$.

Figures 4, 5, 8:
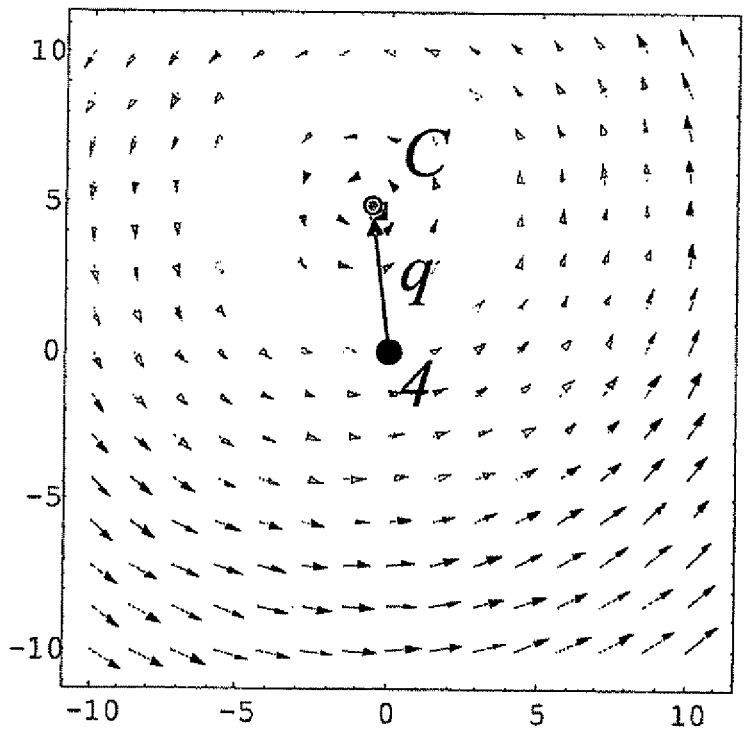
FIG. 4 shows a table in which the positions of the linear acceleration sensors in the coordinates of the body-fixed Cartesian coordinate system are given.
FIG. 5 shows a table in which the directions in which the linear acceleration sensors are sensitive are given in the coordinates of the body-fixed Cartesian coordinate system.
FIG. 8 shows a vector field that contains velocity vectors for a motion of a body, said motion having a translatory and a rotary component, wherein the rotary center of the rotary motion is designated with C.
Figure 9:
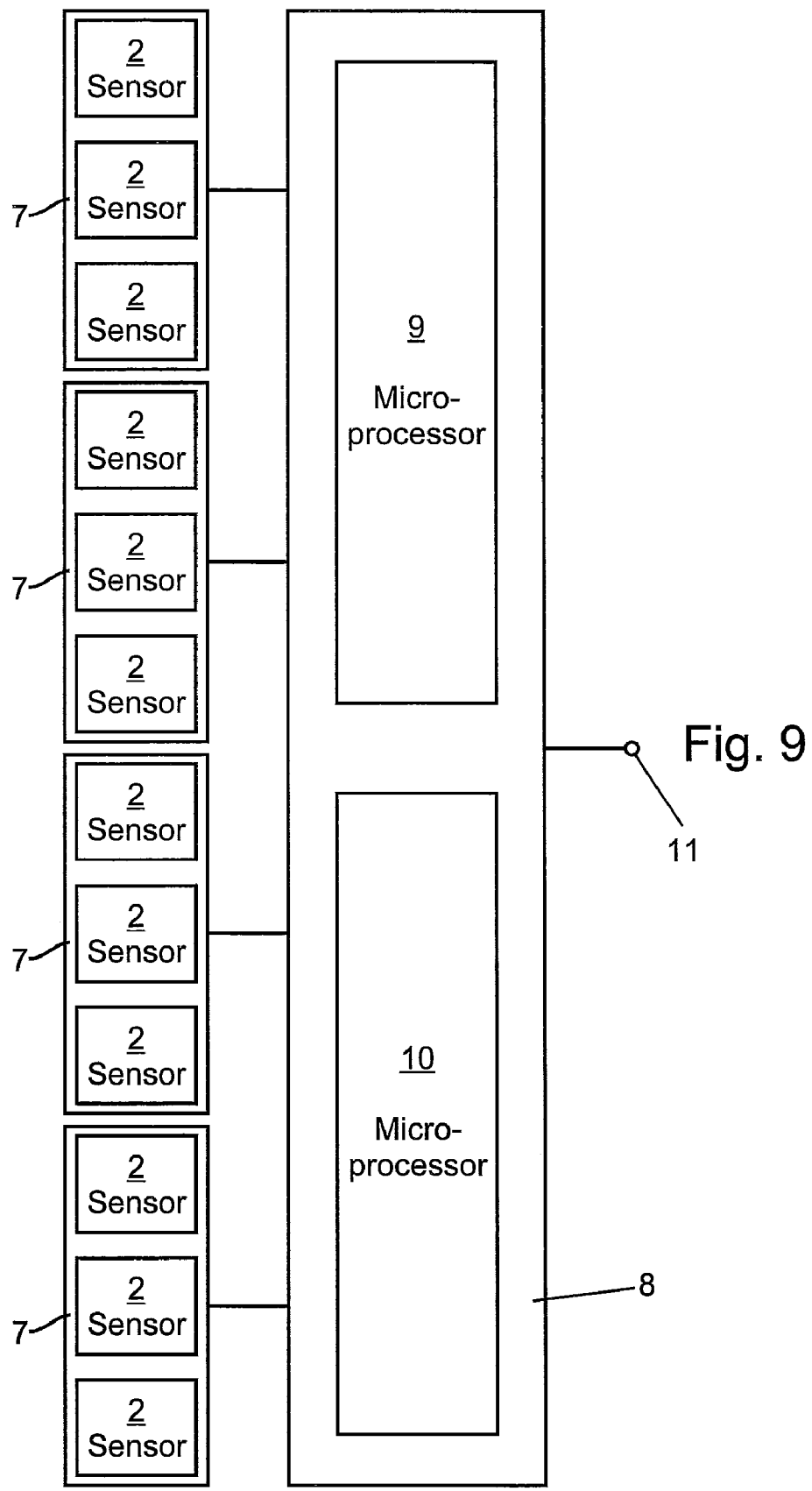
FIG. 9 shows a block diagram of a device for determining the position, velocity, acceleration, and/or the rotary center of a body in a three dimensional space.

In can be discerned from FIG. 3 and the table in FIG. 4, that in each case three linear acceleration sensors 2, of which the measurement axes 3 are oriented in directions running orthogonally to each other, which are not arranged in a plane, are arranged on the same position and form a multidirectional acceleration sensor 7 (FIG. 9).

If the coordinates $r_{xi}, r_{yi}, r_{zi}$ of the twelve position vectors 4, and the coordinates $\Theta_{xi}, \Theta_{yi}, \Theta_{zi}$ of the twelve direction vectors $\vec{\Theta}_i$ are plugged into the matrix A of the equation system shown in FIG. 1a through 1c, the 12×12 matrix shown in FIG. 6 is obtained. The determinant of this matrix is −16 and the rank Rg(A)=12. The condition that the column vectors of the matrix A are linearly independent and that the matrix A is therefore invertible in a manner known per se is thus satisfied. The inverted matrix $A^{-1}$ rounded to three decimal places, which henceforth shall be known as the data matrix, is shown in FIG. 7.

With the data matrix A-1 the vector $\vec{w}=(A_x, A_y, A_z, \dot{\omega}_x, \dot{\omega}_y, \dot{\omega}_z, \omega_x^2, \omega_y^2, \omega_z^2, \omega_x\omega_y, \omega_x\omega_z, \omega_y\omega_z)$ can now be calculated according to equation (8), and the translatory acceleration $\vec{A}=(Ax, Ay, Az)$, the rotary acceleration $\vec{\omega}=(\dot{\omega}_x, \dot{\omega}_y, \dot{\omega}_z)$, the squares of the angular velocities $\omega_x^2, \omega_y^2, \omega_x^2$ of the body 1 relative to the body-fixed axes x, y, z, and mixed terms, which in each case correspond to the product of two different vectorial components $\omega_x^2, \omega_y^2, \omega_x^2$ of the angular velocity of the body 1, can be determined easily.

In order to be able to determine the rotation point of a body, the translation velocity $\vec{A}$ and the rotation $\vec{\omega}$ must be known. The rotation point is then determined by seeking the point at which the velocity quantity disappears. The derivation of the velocity is achieved by superimposing the translation velocity $\dot{R}=v$ and the rotation velocity $\omega=r$. In order for the velocity to disappear, the equation $\omega \times q = -v$ in which q represents the rotation point must be satisfied. The rotation point can then expressed as $q=\omega \times v^{\perp}/\|\omega\|_2^2$ with $v^{\perp}=-(\omega v)\omega/\|\omega\|_2^2$. A vector field of the displaced body 1 with the rotation point C is shown in FIG. 8. The translation velocity is expressed as $v_x=5$ and $v_y=1$ and the rotation $\omega=1$.

It can be discerned in FIG. 9 that the individual linear acceleration sensors 2 are connected to an evaluator 8 for calculating the vector $\vec{w}$ and the coordinates of the rotation point C. The evaluator has a data storage 9 and a microprocessor 10, which is connected to the data storage 9 via a buss system, which is not shown in any further detail in the drawing. The data matrix $A^{-1}$ is filed in the data storage 9. For calculation of the individual components of the vector $\vec{w}=(A_x, A_y, A_z, \dot{\omega}_x, \dot{\omega}_y, \dot{\omega}_z, \omega_x^2, \omega_y^2, \omega_z^2, \omega_x\omega_y, \omega_x\omega_z, \omega_y\omega_y,$ $\omega_z$), the microprocessor 10 in each case calculates the scalar product from the individual line vectors of the data matrix $\underline{A}^{-1}$ and the acceleration measurement signal $\vec{a}=(a_1, a_2, a_3, a_4, \ldots a_n)$ measured with the linear acceleration sensors 2. The vector $\vec{w}=(A_x, A_y, A_z, \dot{\omega}_x, \dot{\omega}_y, \dot{\omega}_z, \omega_x^2, \omega_y^2, \omega_z^2, \omega_x\omega_y, \omega_x\omega_z, \omega_y\omega_z)$, and the rotation point C are allocated to a measurement signal output 11 in the form of a suitable output signal.

In the method for determining the relative position, velocity, acceleration, and/or the rotation center of a body 1 displaceable in a three dimensional space, at least twelve linear acceleration sensors 2 are provided and in each case arranged on a position stationarily fixed with respect to the body 1. At least one acceleration measurement signal is captured by means of the linear acceleration sensors 2. A position, velocity, acceleration, and/or rotation center signal for the body 1 is generated from the acceleration measurement signal and data describing the position and orientation of the linear acceleration sensors 2 in the bodyfixed coordinate system.

The invention claimed is:

1. A method for determining the relative position, velocity, and/or acceleration of a body displaceable in a three dimensional space, wherein a plurality of n linear acceleration sensors, which in each case have a sensitive measurement axis, is provided, wherein said plurality n is at least twelve, wherein the individual linear acceleration sensors are in each case arranged on a position $P_i$ which is stationarily fixed with respect to the body and which can be described by a stationary position vector, $$\vec{r}_i = \begin{pmatrix} r_{xi} \\ r_{yi} \\ r_{zi} \end{pmatrix}$$

which indicates the respective position $P_i$ from a body-fixed reference point, wherein the linear acceleration sensors are aligned so that their measurement axes are always oriented toward a direction vector $$\vec{\Theta}_i = \begin{pmatrix} \Theta_{xi} \\ \Theta_{yi} \\ \Theta_{zi} \end{pmatrix},$$

wherein the respective linear acceleration sensor and the x, y, z axes of a body-fixed coordinate system passing through the reference point are designated in each case by $i\in[1, 2, 3, 4, \ldots n]$, wherein the position vectors $\vec{r}_i$ and the direction vectors $\vec{\Theta}_i$ are selected so that the rank of a twelve column matrix formed from the column vectors $$\vec{s}_1 = \begin{pmatrix} \Theta_{x1} \\ \Theta_{x2} \\ \Theta_{x3} \\ \Theta_{x4} \\ \vdots \\ \Theta_{xn} \end{pmatrix}, \vec{s}_2 = \begin{pmatrix} \Theta_{y1} \\ \Theta_{y2} \\ \Theta_{y3} \\ \Theta_{y4} \\ \vdots \\ \Theta_{yn} \end{pmatrix}, \vec{s}_3 = \begin{pmatrix} \Theta_{z1} \\ \Theta_{z2} \\ \Theta_{z3} \\ \Theta_{z4} \\ \vdots \\ \Theta_{zn} \end{pmatrix}, \vec{s}_4 = \begin{pmatrix} \Theta_{z1}r_{y1} - \Theta_{y1}r_{z1} \\ \Theta_{z2}r_{y2} - \Theta_{y2}r_{z2} \\ \Theta_{z3}r_{y3} - \Theta_{y3}r_{z3} \\ \Theta_{z4}r_{y4} - \Theta_{y4}r_{z4} \\ \vdots \\ \Theta_{zn}r_{yn} - \Theta_{yn}r_{zn} \end{pmatrix},$$

$$\vec{s}_5 = \begin{pmatrix} \Theta_{x1}r_{z1} - \Theta_{z1}r_{x1} \\ \Theta_{x2}r_{z2} - \Theta_{z2}r_{x2} \\ \Theta_{x3}r_{z3} - \Theta_{z3}r_{x3} \\ \Theta_{x4}r_{z4} - \Theta_{z4}r_{x4} \\ \vdots \\ \Theta_{xn}r_{zn} - \Theta_{zn}r_{xn} \end{pmatrix}, \vec{s}_6 = \begin{pmatrix} \Theta_{y1}r_{x1} - \Theta_{x1}r_{y1} \\ \Theta_{y2}r_{x2} - \Theta_{x2}r_{y2} \\ \Theta_{y3}r_{x3} - \Theta_{x3}r_{y3} \\ \Theta_{y4}r_{x4} - \Theta_{x4}r_{y4} \\ \vdots \\ \Theta_{yn}r_{xn} - \Theta_{xn}r_{yn} \end{pmatrix},$$

$$\vec{s}_7 = \begin{pmatrix} \Theta_{y1}r_{y1} - \Theta_{z1}r_{z1} \\ \Theta_{y2}r_{y2} - \Theta_{z2}r_{z2} \\ \Theta_{y3}r_{y3} - \Theta_{z3}r_{z3} \\ \Theta_{y4}r_{y4} - \Theta_{z4}r_{z4} \\ \vdots \\ \Theta_{yn}r_{yn} - \Theta_{zn}r_{zn} \end{pmatrix}, \vec{s}_8 = \begin{pmatrix} \Theta_{x1}r_{x1} - \Theta_{z1}r_{z1} \\ \Theta_{x2}r_{x2} - \Theta_{z2}r_{z2} \\ \Theta_{x3}r_{x3} - \Theta_{z3}r_{z3} \\ \Theta_{x4}r_{x4} - \Theta_{z4}r_{z4} \\ \vdots \\ \Theta_{xn}r_{xn} - \Theta_{zn}r_{zn} \end{pmatrix},$$

$$\vec{s}_9 = \begin{pmatrix} \Theta_{x1}r_{x1} - \Theta_{y1}r_{y1} \\ \Theta_{x2}r_{x2} - \Theta_{y2}r_{y2} \\ \Theta_{x3}r_{x3} - \Theta_{y3}r_{y3} \\ \Theta_{x4}r_{x4} - \Theta_{y4}r_{y4} \\ \vdots \\ \Theta_{xn}r_{xn} - \Theta_{yn}r_{yn} \end{pmatrix}, \vec{s}_{10} = \begin{pmatrix} \Theta_{y1}r_{x1} + \Theta_{x1}r_{y1} \\ \Theta_{y2}r_{x2} + \Theta_{x2}r_{y2} \\ \Theta_{y3}r_{x3} + \Theta_{x3}r_{y3} \\ \Theta_{y4}r_{x4} + \Theta_{x4}r_{y4} \\ \vdots \\ \Theta_{yn}r_{xn} + \Theta_{xn}r_{yn} \end{pmatrix},$$

$$\vec{s}_{11} = \begin{pmatrix} \Theta_{z1}r_{x1} + \Theta_{x1}r_{z1} \\ \Theta_{z2}r_{x2} + \Theta_{x2}r_{z2} \\ \Theta_{z3}r_{x3} + \Theta_{x3}r_{z3} \\ \Theta_{z4}r_{x4} + \Theta_{x4}r_{z4} \\ \vdots \\ \Theta_{zn}r_{xn} + \Theta_{xn}r_{zn} \end{pmatrix} \text{ and } \vec{s}_{12} = \begin{pmatrix} \Theta_{z1}r_{y1} + \Theta_{y1}r_{z1} \\ \Theta_{z2}r_{y2} + \Theta_{y2}r_{z2} \\ \Theta_{z3}r_{y3} + \Theta_{y3}r_{z3} \\ \Theta_{z4}r_{y4} + \Theta_{y4}r_{z4} \\ \vdots \\ \Theta_{zn}r_{yn} + \Theta_{yn}r_{zn} \end{pmatrix}$$

equals twelve, wherein at least one acceleration measurement signal $$\vec{a} = \begin{pmatrix} a_1 \\ a_2 \\ a_3 \\ a_4 \\ \vdots \\ a_n \end{pmatrix}$$

is captured with the linear acceleration sensors, and wherein a position, velocity, and/or acceleration signal is generated for the body from the acceleration measurement signal and data that describe the relative position and orientation of the linear acceleration sensors in the body-fixed coordinate system.

2. The method as in claim 1, characterized in that after the arrangement of the linear acceleration signals on the positions $P_i$, at least five measurements are taken in which the body is accelerated linearly and/or about at least one known rotation center in various known directions with respect to an earth-fixed coordinate system, in that with each measurement an acceleration measurement signal $$\vec{a}_k = \begin{pmatrix} a_{1k} \\ a_{2k} \\ a_{3k} \\ a_{4k} \\ \vdots \\ a_{nk} \end{pmatrix}$$

is always captured, and in that the data for the position and orientation of the linear acceleration sensors are determined from the acceleration measurement signals $\vec{a}_k$ and the directions and/or the at least one rotation center.

3. The method as in claim 1, characterized in that the relative position of a rotation center about which the body rotates in the space is determined from the velocity signal.

4. A device for determining the relative position, velocity, and/or acceleration of a body displaceable in a three dimensional space, wherein the device for the capture of at least one acceleration measurement signal $$\vec{a} = \begin{pmatrix} a_1 \\ a_2 \\ a_3 \\ a_4 \\ \vdots \\ a_n \end{pmatrix}$$

has a plurality of n linear acceleration sensors in a body-fixed arrangement with respect to the body, wherein the plurality n is at least twelve, wherein the positions $P_i$ on which the linear acceleration sensors are arranged can be described in each case by a stationary position vector $$\vec{r}_i = \begin{pmatrix} r_{xi} \\ r_{yi} \\ r_{zi} \end{pmatrix},$$

which indicates the respective position $P_i$ from a body-fixed reference point, wherein the linear acceleration sensors in each case have a sensitive measurement axis, which is oriented towards a direction vector $$\vec{\Theta}_i = \begin{pmatrix} \Theta_{xi} \\ \Theta_{yi} \\ \Theta_{zi} \end{pmatrix},$$

wherein the respective linear acceleration sensor and the x, y, z axes of a body-fixed coordinate system passing through the reference point are designated in each case by $i \in [1, 2, 3, 4, \ldots n]$, wherein the position vectors $\vec{r}_i$ and the direction vectors $\vec{\Theta}_i$ are selected so that the rank of a twelve column matrix formed from the column vectors $$\vec{s}_1 = \begin{pmatrix} \Theta_{x1} \\ \Theta_{x2} \\ \Theta_{x3} \\ \Theta_{x4} \\ \vdots \\ \Theta_{xn} \end{pmatrix}, \vec{s}_2 = \begin{pmatrix} \Theta_{y1} \\ \Theta_{y2} \\ \Theta_{y3} \\ \Theta_{y4} \\ \vdots \\ \Theta_{yn} \end{pmatrix}, \vec{s}_3 = \begin{pmatrix} \Theta_{z1} \\ \Theta_{z2} \\ \Theta_{z3} \\ \Theta_{z4} \\ \vdots \\ \Theta_{zn} \end{pmatrix}, \vec{s}_4 = \begin{pmatrix} \Theta_{z1}r_{y1} - \Theta_{y1}r_{z1} \\ \Theta_{z2}r_{y2} - \Theta_{y2}r_{z2} \\ \Theta_{z3}r_{y3} - \Theta_{y3}r_{z3} \\ \Theta_{z4}r_{y4} - \Theta_{y4}r_{z4} \\ \vdots \\ \Theta_{zn}r_{yn} - \Theta_{yn}r_{zn} \end{pmatrix},$$

$$\vec{s}_5 = \begin{pmatrix} \Theta_{x1}r_{z1} - \Theta_{z1}r_{x1} \\ \Theta_{x2}r_{z2} - \Theta_{z2}r_{x2} \\ \Theta_{x3}r_{z3} - \Theta_{z3}r_{x3} \\ \Theta_{x4}r_{z4} - \Theta_{z4}r_{x4} \\ \vdots \\ \Theta_{xn}r_{zn} - \Theta_{zn}r_{xn} \end{pmatrix}, \vec{s}_6 = \begin{pmatrix} \Theta_{y1}r_{x1} - \Theta_{x1}r_{y1} \\ \Theta_{y2}r_{x2} - \Theta_{x2}r_{y2} \\ \Theta_{y3}r_{x3} - \Theta_{x3}r_{y3} \\ \Theta_{y4}r_{x4} - \Theta_{x4}r_{y4} \\ \vdots \\ \Theta_{yn}r_{xn} - \Theta_{xn}r_{yn} \end{pmatrix},$$

$$\vec{s}_7 = \begin{pmatrix} \Theta_{y1}r_{y1} - \Theta_{z1}r_{z1} \\ \Theta_{y2}r_{y2} - \Theta_{z2}r_{z2} \\ \Theta_{y3}r_{y3} - \Theta_{z3}r_{z3} \\ \Theta_{y4}r_{y4} - \Theta_{z4}r_{z4} \\ \vdots \\ \Theta_{yn}r_{yn} - \Theta_{zn}r_{zn} \end{pmatrix}, \vec{s}_8 = \begin{pmatrix} \Theta_{x1}r_{x1} - \Theta_{z1}r_{z1} \\ \Theta_{x2}r_{x2} - \Theta_{z2}r_{z2} \\ \Theta_{x3}r_{x3} - \Theta_{z3}r_{z3} \\ \Theta_{x4}r_{x4} - \Theta_{z4}r_{z4} \\ \vdots \\ \Theta_{xn}r_{xn} - \Theta_{zn}r_{zn} \end{pmatrix},$$

$$\vec{s}_9 = \begin{pmatrix} \Theta_{x1}r_{x1} - \Theta_{y1}r_{y1} \\ \Theta_{x2}r_{x2} - \Theta_{y2}r_{y2} \\ \Theta_{x3}r_{x3} - \Theta_{y3}r_{y3} \\ \Theta_{x4}r_{x4} - \Theta_{y4}r_{y4} \\ \vdots \\ \Theta_{xn}r_{xn} - \Theta_{yn}r_{yn} \end{pmatrix}, \vec{s}_{10} = \begin{pmatrix} \Theta_{y1}r_{x1} + \Theta_{x1}r_{y1} \\ \Theta_{y2}r_{x2} + \Theta_{x2}r_{y2} \\ \Theta_{y3}r_{x3} + \Theta_{x3}r_{y3} \\ \Theta_{y4}r_{x4} + \Theta_{x4}r_{y4} \\ \vdots \\ \Theta_{yn}r_{xn} + \Theta_{xn}r_{yn} \end{pmatrix},$$

$$\vec{s}_{11} = \begin{pmatrix} \Theta_{z1}r_{x1} + \Theta_{x1}r_{z1} \\ \Theta_{z2}r_{x2} + \Theta_{x2}r_{z2} \\ \Theta_{z3}r_{x3} + \Theta_{x3}r_{z3} \\ \Theta_{z4}r_{x4} + \Theta_{x4}r_{z4} \\ \vdots \\ \Theta_{zn}r_{xn} + \Theta_{xn}r_{zn} \end{pmatrix} \text{ and } \vec{s}_{12} = \begin{pmatrix} \Theta_{z1}r_{y1} + \Theta_{y1}r_{z1} \\ \Theta_{z2}r_{y2} + \Theta_{y2}r_{z2} \\ \Theta_{z3}r_{y3} + \Theta_{y3}r_{z3} \\ \Theta_{z4}r_{y4} + \Theta_{y4}r_{z4} \\ \vdots \\ \Theta_{zn}r_{yn} + \Theta_{yn}r_{zn} \end{pmatrix}$$

equals twelve, and wherein the linear acceleration sensors are connected to an evaluator, which is configured to generate a position, velocity, and/or acceleration signal for the body from the acceleration measurement signal $\vec{a}$ and data that describe the relative position and orientation of the linear acceleration sensors in the body-fixed coordinate system.

5. The device as in claim 4, characterized in that the evaluator has a data storage in which at least one data signal for a line vector of a data matrix is filed, which is the inverse of a twelve column matrix comprising the column vectors $\vec{s}_1$, $\vec{s}_2$, $\vec{s}_3$, $\vec{s}_4$, $\vec{s}_5$, $\vec{s}_6$, $\vec{s}_7$, $\vec{s}_8$, $\vec{s}_9$, $\vec{s}_{10}$, $\vec{s}_{11}$ and $\vec{s}_{12}$.

6. The device as in claim 5, characterized in that the evaluator has means for generating at least one scalar product signal corresponding to the scalar product from the at least one data signal and the acceleration measurement signal $\vec{a}$, and in that the at least one data signal is selected so that the at least one scalar product signal corresponds to a vectorial component of the translatory acceleration of the body.

7. The device as in claim 5, characterized in that the evaluator has means for generating at least one scalar product signal corresponding to the scalar product from the at least one data signal and the acceleration measurement signal $\vec{a}$, and in that the at least one data signal is selected so that the scalar product signal corresponds to a vectorial component of the angulatory acceleration of the body.

8. The device as in claim 7, characterized in that the evaluator has means, should the need arise, for the two-fold integration of the at least one scalar product signal.

9. The device as in claim 7, characterized in that the evaluator has means for generating at least one additional scalar product signal corresponding to the scalar product from the at least one data signal and the acceleration measurement signal $\vec{a}$, in that the at least one data signal is selected so that the additional scalar product signal corresponds to the square of a vectorial component of the angular velocity of the body, and in that the evaluator has means for generating a square root signal from the additional scalar product signal, and in that the comparison mechanism is configured to compare the square root signal with the signal generated by integration of the at least one scalar product signal, and in that the comparison mechanism has an output for an error status signal dependent on the result of the comparison.

10. The device as in claim 7, characterized in that the evaluator has means for generating at least one additional scalar product signal corresponding to the scalar product from the at least one data signal and the acceleration measurement signal $\vec{a}$, in that the at least one data signal is selected so that the additional scalar product signal corresponds to the square of a vectorial component of the angular velocity of the body, and in that the evaluator has means for generating a square root signal from the additional scalar product signal, and in that the evaluator has means for the integration of the scalar product signal and for the formation of the square from the result of said integration, in that said means for comparing the signal thus received with the additional scalar product signal is connected to the comparison mechanism, and in that the comparison mechanism has an output for an error status signal dependent on the result of the comparison.

11. The device as in claim 7, characterized in that the evaluator has means for generating at least one additional scalar product signal corresponding to the scalar product from the at least one data signal and the acceleration measurement signal $\vec{a}$, in that the at least one data signal is selected so that the additional scalar product signal corresponds to the square of a vectorial component of the angular velocity of the body, and in that the evaluator has means for generating a square root signal from the additional scalar product signal, and in that the evaluator has a differentiation mechanism for the differentiation of the square root signal, in that the differentiation mechanism for comparing the differentiated signal with the scalar product signal is connected to the comparison mechanism, and in that the comparison mechanism has an output for an error status signal dependent on the result of the comparison.

12. The device as in claim 5, characterized in that the evaluator has means for generating at least one scalar product signal corresponding to the scalar product from the at least one data signal and the acceleration measurement signal $\vec{a}$, in that the at least one data signal is selected so that the scalar product signal corresponds to the square of a vectorial component of the angular velocity of the body, and in that the evaluator has means for generating a square root signal from the scalar product signal.

13. The device as in claim 5, characterized in that the evaluator has means for generating at least one scalar product signal corresponding to the scalar product from the at least one data signal and the acceleration measurement signal $\vec{a}$, in that the at least one data signal is selected so that the scalar product signal corresponds to the product of two different vectorial components of the angular velocity of the body, in that the evaluator has means for integration of the scalar product signals detected in each case for the respective vectorial components and for the generation of at least one product signal from the results of these integrations, in that the evaluator has a comparison mechanism for comparing the magnitude of this product signal with the scalar product signal, and in that the comparison mechanism has an output for an error status signal dependent on the result of the comparison.

14. The device as in claim 4, characterized in that the evaluator is configured so that in the event of a rotary motion of the body about a rotation center it generates a signal for the relative position of a rotation center from the velocity signal.

15. The device as in claim 4, characterized in that the body is a vehicle.

* * * * *

UNITED STATES PATENT AND TRADEMARK OFFICE
CERTIFICATE OF CORRECTION

PATENT NO.       : 8,037,759 B2
APPLICATION NO.  : 11/916377
DATED            : October 18, 2011
INVENTOR(S)      : Christian Peters et al.

It is certified that error appears in the above-identified patent and that said Letters Patent is hereby corrected as shown below:

In the Specification:

Column 3, Lines 35-49, insert a negative sign -- - -- in vector $S_7$, in front of $\Theta_{y1}r_{y1}$, $\Theta_{y2}r_{y2}$, $\Theta_{y3}r_{y3}$, $\Theta_{y4}r_{y4}$, and $\Theta_{yn}r_{yn}$, in vector $S_8$, in front of $\Theta_{x1}r_1$, $\Theta_{x2}r_2$, $\Theta_{x3}r_3$, $\Theta_{x4}r_4$, and $\Theta_{xn}r_n$, and vector $S_9$, in front of $\Theta_{x1}r_1$, $\Theta_{x2}r_2$, $\Theta_{x3}r_3$, $\Theta_{x4}r_4$, and $\Theta_{xn}r_n$, so that the equation reflects:

$$\vec{S}_7 = \begin{pmatrix} -\Theta_{y1}r_{y1} - \Theta_{z1}r_{z1} \\ -\Theta_{y2}r_{y2} - \Theta_{z2}r_{z2} \\ -\Theta_{y3}r_{y3} - \Theta_{z3}r_{z3} \\ -\Theta_{y4}r_{y4} - \Theta_{z4}r_{z4} \\ \vdots \\ -\Theta_{yn}r_{yn} - \Theta_{zn}r_{zn} \end{pmatrix}, \quad \vec{S}_8 = \begin{pmatrix} -\Theta_{x1}r_{x1} - \Theta_{z1}r_{z1} \\ -\Theta_{x2}r_{x2} - \Theta_{z2}r_{z2} \\ -\Theta_{x3}r_{x3} - \Theta_{z3}r_{z3} \\ -\Theta_{x4}r_{x4} - \Theta_{z4}r_{z4} \\ \vdots \\ -\Theta_{xn}r_{xn} - \Theta_{zn}r_{zn} \end{pmatrix}, \quad \vec{S}_9 = \begin{pmatrix} -\Theta_{x1}r_{x1} - \Theta_{y1}r_{y1} \\ -\Theta_{x2}r_{x2} - \Theta_{y2}r_{y2} \\ -\Theta_{x3}r_{x3} - \Theta_{y3}r_{y3} \\ -\Theta_{x4}r_{x4} - \Theta_{y4}r_{y4} \\ \vdots \\ -\Theta_{xn}r_{xn} - \Theta_{yn}r_{yn} \end{pmatrix}$$

Column 6, Lines 24-39, insert a negative sign -- - -- in vector $S_7$, in front of $\Theta_{y1}r_{y1}$, $\Theta_{y2}r_{y2}$, $\Theta_{y3}r_{y3}$, $\Theta_{y4}r_{y4}$, and $\Theta_{yn}r_{yn}$, in vector $S_8$, in front of $\Theta_{x1}r_1$, $\Theta_{x2}r_2$, $\Theta_{x3}r_3$, $\Theta_{x4}r_4$, and $\Theta_{xn}r_n$, and vector $S_9$, in front of $\Theta_{x1}r_1$, $\Theta_{x2}r_2$, $\Theta_{x3}r_3$, $\Theta_{x4}r_4$, and $\Theta_{xn}r_n$, so that the equation reflects:

$$\vec{S}_7 = \begin{pmatrix} -\Theta_{y1}r_{y1} - \Theta_{z1}r_{z1} \\ -\Theta_{y2}r_{y2} - \Theta_{z2}r_{z2} \\ -\Theta_{y3}r_{y3} - \Theta_{z3}r_{z3} \\ -\Theta_{y4}r_{y4} - \Theta_{z4}r_{z4} \\ \vdots \\ -\Theta_{yn}r_{yn} - \Theta_{zn}r_{zn} \end{pmatrix}, \quad \vec{S}_8 = \begin{pmatrix} -\Theta_{x1}r_{x1} - \Theta_{z1}r_{z1} \\ -\Theta_{x2}r_{x2} - \Theta_{z2}r_{z2} \\ -\Theta_{x3}r_{x3} - \Theta_{z3}r_{z3} \\ -\Theta_{x4}r_{x4} - \Theta_{z4}r_{z4} \\ \vdots \\ -\Theta_{xn}r_{xn} - \Theta_{zn}r_{zn} \end{pmatrix}, \quad \vec{S}_9 = \begin{pmatrix} -\Theta_{x1}r_{x1} - \Theta_{y1}r_{y1} \\ -\Theta_{x2}r_{x2} - \Theta_{y2}r_{y2} \\ -\Theta_{x3}r_{x3} - \Theta_{y3}r_{y3} \\ -\Theta_{x4}r_{x4} - \Theta_{y4}r_{y4} \\ \vdots \\ -\Theta_{xn}r_{xn} - \Theta_{yn}r_{yn} \end{pmatrix}$$

Signed and Sealed this
Eighth Day of October, 2013

Teresa Stanek Rea
*Deputy Director of the United States Patent and Trademark Office*

CERTIFICATE OF CORRECTION (continued)
U.S. Pat. No. 8,037,759 B2

In the Claims:

Column 12, Lines 13-29, Claim 1, insert a negative sign -- - -- in vector $S_7$, in front of $\Theta_{y1}r_{y1}$, $\Theta_{y2}r_{y2}$, $\Theta_{y3}r_{y3}$, $\Theta_{y4}r_{y4}$, and $\Theta_{yn}r_{yn}$, in vector $S_8$, in front of $\Theta_{x1}r_1$, $\Theta_{x2}r_2$, $\Theta_{x3}r_3$, $\Theta_{x4}r_4$, and $\Theta_{xn}r_n$, and vector $S_9$, in front of $\Theta_{x1}r_1$, $\Theta_{x2}r_2$, $\Theta_{x3}r_3$, $\Theta_{x4}r_4$, and $\Theta_{xn}r_n$, so that the equation reflects:

$$\bar{S}_7 = \begin{pmatrix} -\Theta_{y1}r_{y1} - \Theta_{z1}r_{z1} \\ -\Theta_{y2}r_{y2} - \Theta_{z2}r_{z2} \\ -\Theta_{y3}r_{y3} - \Theta_{z3}r_{z3} \\ -\Theta_{y4}r_{y4} - \Theta_{z4}r_{z4} \\ \vdots \\ -\Theta_{yn}r_{yn} - \Theta_{zn}r_{zn} \end{pmatrix}, \bar{S}_8 = \begin{pmatrix} -\Theta_{x1}r_{x1} - \Theta_{z1}r_{z1} \\ -\Theta_{x2}r_{x2} - \Theta_{z2}r_{z2} \\ -\Theta_{x3}r_{x3} - \Theta_{z3}r_{z3} \\ -\Theta_{x4}r_{x4} - \Theta_{z4}r_{z4} \\ \vdots \\ -\Theta_{xn}r_{xn} - \Theta_{zn}r_{zn} \end{pmatrix}, \bar{S}_9 = \begin{pmatrix} -\Theta_{x1}r_{x1} - \Theta_{y1}r_{y1} \\ -\Theta_{x2}r_{x2} - \Theta_{y2}r_{y2} \\ -\Theta_{x3}r_{x3} - \Theta_{y3}r_{y3} \\ -\Theta_{x4}r_{x4} - \Theta_{y4}r_{y4} \\ \vdots \\ -\Theta_{xn}r_{xn} - \Theta_{yn}r_{yn} \end{pmatrix}$$

Column 14, lines 19-34, Claim 4, insert a negative sign -- - -- in vector $S_7$, in front of $\Theta_{y1}r_{y1}$, $\Theta_{y2}r_{y2}$, $\Theta_{y3}r_{y3}$, $\Theta_{y4}r_{y4}$, and $\Theta_{yn}r_{yn}$, in vector $S_8$, in front of $\Theta_{x1}r_1$, $\Theta_{x2}r_2$, $\Theta_{x3}r_3$, $\Theta_{x4}r_4$, and $\Theta_{xn}r_n$, and vector $S_9$, in front of $\Theta_{x1}r_1$, $\Theta_{x2}r_2$, $\Theta_{x3}r_3$, $\Theta_{x4}r_4$, and $\Theta_{xn}r_n$, so that the equation reflects:

$$\bar{S}_7 = \begin{pmatrix} -\Theta_{y1}r_{y1} - \Theta_{z1}r_{z1} \\ -\Theta_{y2}r_{y2} - \Theta_{z2}r_{z2} \\ -\Theta_{y3}r_{y3} - \Theta_{z3}r_{z3} \\ -\Theta_{y4}r_{y4} - \Theta_{z4}r_{z4} \\ \vdots \\ -\Theta_{yn}r_{yn} - \Theta_{zn}r_{zn} \end{pmatrix}, \bar{S}_8 = \begin{pmatrix} -\Theta_{x1}r_{x1} - \Theta_{z1}r_{z1} \\ -\Theta_{x2}r_{x2} - \Theta_{z2}r_{z2} \\ -\Theta_{x3}r_{x3} - \Theta_{z3}r_{z3} \\ -\Theta_{x4}r_{x4} - \Theta_{z4}r_{z4} \\ \vdots \\ -\Theta_{xn}r_{xn} - \Theta_{zn}r_{zn} \end{pmatrix}, \bar{S}_9 = \begin{pmatrix} -\Theta_{x1}r_{x1} - \Theta_{y1}r_{y1} \\ -\Theta_{x2}r_{x2} - \Theta_{y2}r_{y2} \\ -\Theta_{x3}r_{x3} - \Theta_{y3}r_{y3} \\ -\Theta_{x4}r_{x4} - \Theta_{y4}r_{y4} \\ \vdots \\ -\Theta_{xn}r_{xn} - \Theta_{yn}r_{yn} \end{pmatrix}$$